United States Patent
Zhang

(10) Patent No.: US 11,244,198 B2
(45) Date of Patent: Feb. 8, 2022

(54) INPUT PARTITIONING FOR DEEP LEARNING OF LARGE IMAGE DATA

(71) Applicant: International Business Machines Corporation, Armonk, NY (US)

(72) Inventor: Li Zhang, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 50 days.

(21) Appl. No.: 16/690,166

(22) Filed: Nov. 21, 2019

(65) Prior Publication Data

US 2021/0158072 A1  May 27, 2021

(51) Int. Cl.
| | | |
|---|---|---|
| *G06K 9/00* | (2006.01) | |
| *G06K 9/62* | (2006.01) | |
| *G06K 9/46* | (2006.01) | |
| *G06F 9/50* | (2006.01) | |
| *G06N 3/08* | (2006.01) | |

(52) U.S. Cl.
CPC ......... *G06K 9/6202* (2013.01); *G06F 9/5044* (2013.01); *G06K 9/46* (2013.01); *G06N 3/08* (2013.01)

(58) Field of Classification Search
CPC ...... G06K 9/6202; G06K 9/46; G06F 9/5044; G06N 3/08
See application file for complete search history.

(56) References Cited

U.S. PATENT DOCUMENTS

| | | |
|---|---|---|
| 8,983,185 B2 | 3/2015 | Deng et al. |
| 9,818,059 B1 | 11/2017 | Woo et al. |
| 2016/0062947 A1* | 3/2016 | Chetlur .................. G06F 17/153 708/420 |
| 2017/0161604 A1 | 6/2017 | Craddock et al. |
| 2018/0101769 A9 | 4/2018 | Garner |
| 2018/0357541 A1 | 12/2018 | Chen et al. |
| 2020/0126207 A1* | 4/2020 | Saltz ..................... G06T 7/0012 |

(Continued)

FOREIGN PATENT DOCUMENTS

CN   107437110 A   12/2017

OTHER PUBLICATIONS

Aghdasi, Reduction of Boundary Artifacts in Image Restoration, IEEE TR. On Image Processing vol. 5 No. 4 p. 611-618 (Year: 1996).*

(Continued)

*Primary Examiner* — Ping Y Hsieh
*Assistant Examiner* — Xiao Liu
(74) *Attorney, Agent, or Firm* — Randy E. Tejeda

(57) ABSTRACT

In an approach to processing large high dimensional images in parallel without losing accuracy, one or more computer processors determine a required amount of graphics processing unit memory for an image. The one or more computer processors determine one or more coordinate partitions based on the determined required amount of graphics and one or more characteristics of the image. The one or more computer processors determine a padding size for each of the determined one or more coordinate partitions. The one or more computer processors partition the image based on the one or more determined coordinate partitions and the determined padding size. The one or more computer processors generate a prediction for the partitioned image utilizing a trained model.

20 Claims, 3 Drawing Sheets

(56) References Cited

U.S. PATENT DOCUMENTS

2020/0183833 A1* 6/2020 Sakharshete ........... G06N 3/063
2021/0014537 A1* 1/2021 Hu ....................... H04N 19/119

OTHER PUBLICATIONS

Roth et al., "Hierarchical 3D fully convolutional networks for multi organ segmentation", arXiv:1704.06382v1 [cs.CV] Apr. 21, 2017, 11 pages.

* cited by examiner

INPUT PARTITIONING FOR DEEP LEARNING OF LARGE IMAGE DATA

BACKGROUND

The present invention relates generally to the field of deep learning, and more particularly to processing large high dimensional images.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems "learn" to perform tasks by considering examples, generally without being programmed with any task-specific rules. For example, in image recognition, NNs learn to identify images that contain cats by analyzing example images that are correctly labeled as "cat" or "not cat" and using the results to identify cats in other images. NNs accomplish this without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of multilayer perceptrons (e.g., fully connected networks), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then move across the image by a designated stride length. Therefore, on the scale of connectedness and complexity, CNNs are on the lower extreme. CNNs use relatively little pre-processing compared to other image classification algorithms, allowing the network to learn the filters that in traditional algorithms were hand-engineered.

SUMMARY

Embodiments of the present invention disclose a computer-implemented method, a computer program product, and a system for processing large high dimensional images in parallel without losing accuracy. The computer-implemented method includes one or more computer processors determining a required amount of graphics processing unit memory for an image. The one or more computer processors determine one or more coordinate partitions based on the determined required amount of graphics and one or more characteristics of the image. The one or more computer processors determine a padding size for each of the determined one or more coordinate partitions. The one or more computer processors partition the image based on the one or more determined coordinate partitions and the determined padding size. The one or more computer processors generate a prediction for the partitioned image utilizing a trained model.

DETAILED DESCRIPTION

Traditionally, deep learning image processing and recognition models, techniques, and methods are utilized in many application areas such as facial recognition, self-driving cars, medical imaging (e.g., magnetic resonance imaging (MRI), etc.), and video applications. Typically, every image has varying workload characteristics, but most models are computationally intensive. Said computations increase exponentially when the size of the input data increases, for example, when a 2D or 3D video or image is large. Current graphics processing units (GPUs) have limited amounts of dedicated memory, normally ranging between 2 gigabytes and 16 gigabytes. Traditionally, GPUs do not have the required amount of memory to process large 3D images, especially at high resolutions or dimensions. Furthermore, sampling said images to lower resolutions capable of fitting on GPU memory causes a significant reduction in accuracy.

Embodiments of the present invention allow for a processing of large, high dimension, images in parallel without losing accuracy. Embodiments of the present invention process large and high dimension images on systems and GPUs with limited memory. Embodiments of the present invention reduce distortion from partitioning. Embodiments of the present invention scale out training to multiple GPUs on multiple systems. Embodiments of the present invention recognize that system efficiency is increased by reducing an image into multiple partitions, allowing parallelization and subsequent training of one or more models utilizing said multiple partitions thereby decreasing the required computational time. Embodiments of the present invention recognize that system requirements are reduced by partitioning and parallelizing an image into a format that is accessible by a plurality of low memory GPUs. Implementation of embodiments of the invention may take a variety of forms, and exemplary implementation details are discussed subsequently with reference to the Figures.

The present invention will now be described in detail with reference to the Figures.

Figure 1:
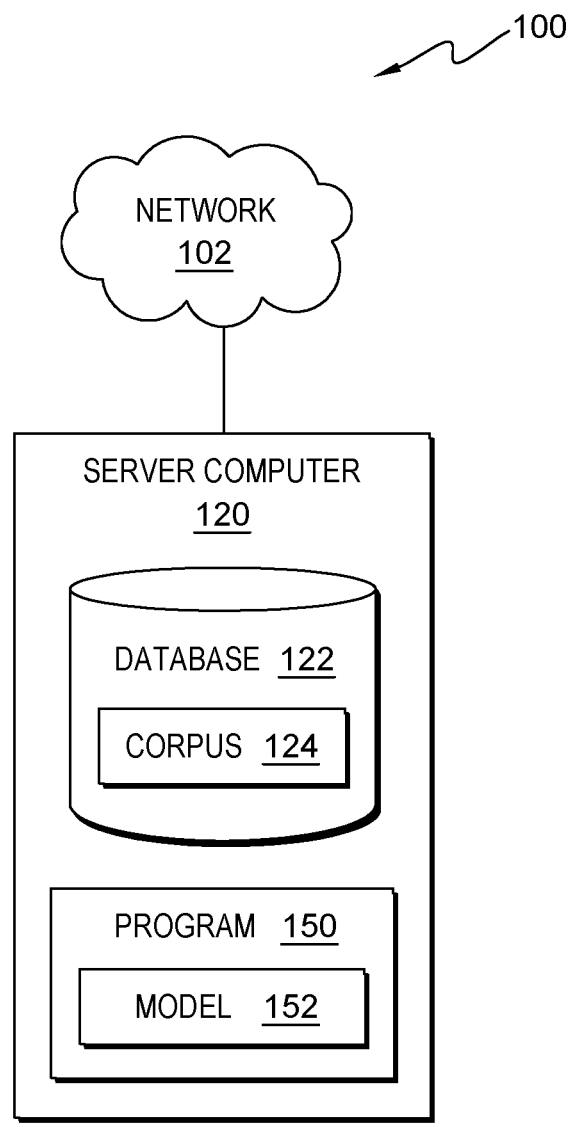
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted, and described in further detail with respect to FIG. 3.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historically partitioned images and associated metadata (e.g., coordinate partitions, original image size, generated padding sizes, associated trained models, etc.). In the depicted embodiment, database 122 contains corpus 124.

Corpus 124 contains one or more examples, sets of training data, data structures, and/or variables used to fit the parameters of a specified model. The contained data comprises of pairs of input vectors (e.g., pixel vectors) with associated output vectors (e.g., classifications, labels, etc.). In an embodiment, corpus 124 may contain one or more sets of one or more instances of unclassified or classified (e.g., labelled) data, hereinafter referred to as training statements. In another embodiment, the training data contains an array of training statements organized in labelled training sets. For example, a plurality of training sets includes labels paired with training statements (e.g., images, image feature vectors, stub images, etc.). In an embodiment, each training set includes a label and an associated array or set of training statements which can be utilized to train one or more models. In an embodiment, corpus 124 contains unprocessed training data. In a further embodiment, corpus 124 contains vectorized (i.e., one-hot encoding, dimension reduced, etc.) training sets, associated training statements, and labels. In an embodiment, corpus 124 stores ground truth-based image sets.

Model 152 utilizes deep learning techniques to perform a plurality of image related applications, such as image identification and classification, based on a plurality of features. Specifically, model 158 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised and/or unsupervised methods. In the depicted embodiment, model 152 utilizes a CNN trained utilizing partitioned and padded images. Model 152 assesses an image by considering different features, available as structured (e.g., sets of partitioned images) or unstructured data, and applying relative numerical weights. Program 150 feeds a vectorized training set of feature data to model 152. In various embodiments, the data (images) is labeled with an associated classification enabling model 152 to learn what features are correlated to a specific comment, prior to use. In an embodiment, model 152 learns from training sets to distinguish between likely and unlikely classifications based on an image. In this embodiment, once trained, model 152 can generate classifications based on the data aggregated and fed by program 150. Program 150 is depicted and described in further detail with respect to FIG. 2.

Program 150 is a program for processing large, high dimensional, images in parallel without losing accuracy. In various embodiments, program 150 may implement the following steps: determine one or more coordinate partitions based on the determined required amount of graphics and one or more characteristics of the image; determine a padding size for each of the determined one or more coordinate partitions; partition the image based on the one or more determined coordinate partitions and the determined padding size; generate a prediction for the partitioned image utilizing a trained model. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
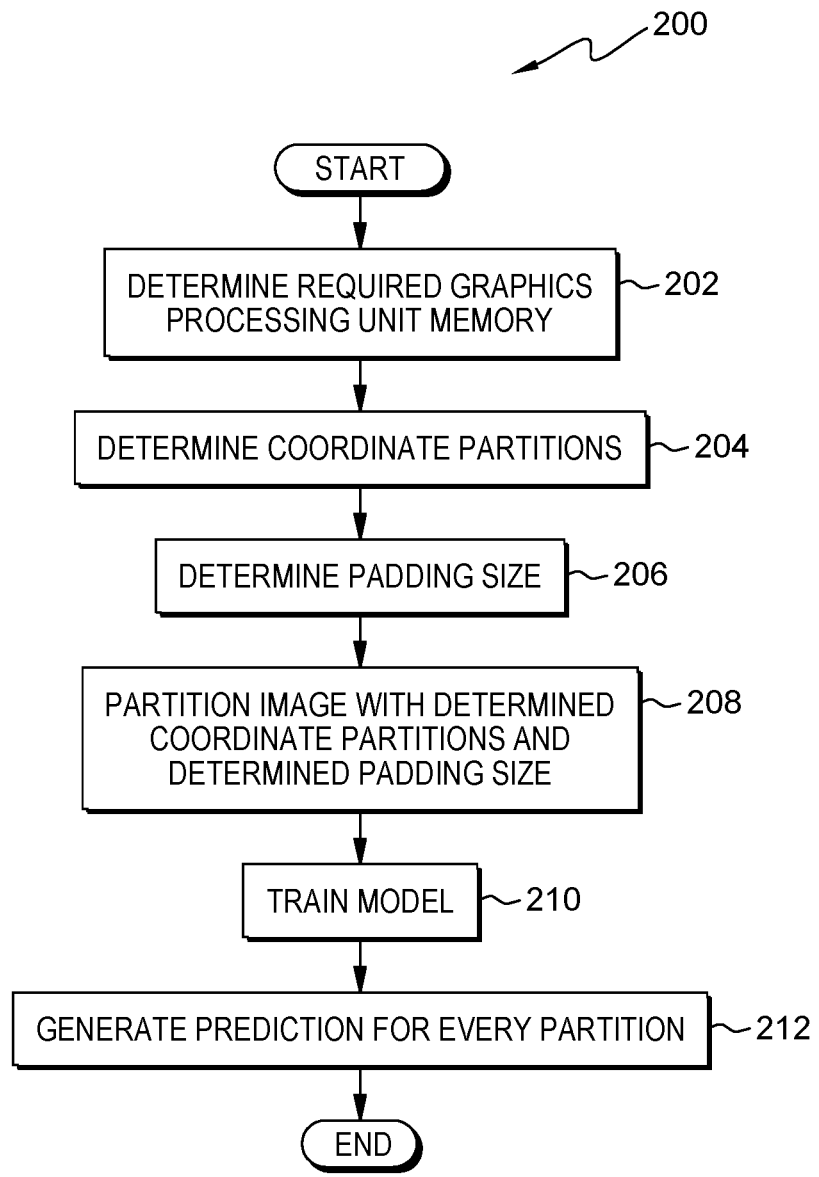
FIG. 2 is a flowchart depicting operational steps of a program, on a server computer within the computational environment of FIG. 1, for processing large, high dimensional, images in parallel without losing accuracy, in accordance with an embodiment of the present invention.

FIG. 2 is a flowchart depicting operational steps of program 150 for processing large, high dimensional, images in parallel without losing accuracy, in accordance with an embodiment of the present invention.

Program 150 determines required graphics processing unit memory (step 202). Program 150 utilizes static analysis tools to analyze a structure of a neural network in order to obtain a required amount of GPU memory for a given image and an associated image resolution. Program 150 analyzes an input image for a plurality of descriptive, image information (e.g., characteristics) such as image size, resolution (e.g., height, width, or depth), compression type, associated metadata, and pixel quantity. In an embodiment, program 150 utilizes historical images and associated historical models to calculate minimum requirements for a current model to sufficiently process the given image.

Program 150 determines a plurality of system specifications associated with one or more model training systems. In an embodiment, program 150 includes model type, model size, and intermediate data size as additional factors for GPU memory determination. In an embodiment, program 150 analyzes historical models for model characteristic information. In this embodiment, program 150 predicts and analyzes the deep learning model characteristics, such as model configuration (i.e., number of neurons, number of layers, tensor size, numbers of activations, parameter size, trainable parameters, and non-trainable parameters), model execution (i.e., CPU utilization, GPU utilization, GPU memory utilization, CPU memory utilization, and number of spawned CPU processes), model characteristics (i.e., time per iteration, CPU-GPU communication time, GPU compute time, CPU time utilization, scaling efficiency for multiple GPUs, and network latency), model convergence hyperparameters (i.e., batch size, training samples, evaluation samples, loss function, optimizer, learning rate, and momentum), data configuration (i.e., dataset size and data processing time). For example, program 150 analyzes the data contained in an image to predict model information and associated computational requirements.

Program 150, then, analyzes available training systems and machines. In an embodiment, program 150 analyzes an associated training environment/system associated for a plurality of system configuration information. In an embodiment, program 150 identifies a training system when program 150 detects an image for processing. Program 150 determines capabilities of a training system/environment. In an embodiment, the capabilities include, but are not limited to, CPU configurations (i.e., number of CPU cores, number of threads per CPU core, non-uniform memory access (NUMA) nodes, remote memory access latency, memory bandwidth, CPU-GPU link bandwidth/latency, and CPU-CPU interconnection bandwidth/latency) and graphical processing unit (GPU) configurations (i.e., number of GPUs, GPU compute capability (FLOPS), available GPU memory, GPU topology, GPU-GPU link bandwidth, and GPU-GPU link latency). In an embodiment, program 150 determines system capabilities and configurations by pinging and polling said system. For example, a system responds with device identification information, which may include capability parameters, to program 150 after a successful ping request. In another embodiment, program 150 identifies a system utilizing a unique product identifier, manufacturer part number, and/or part number. In a further embodiment, program 150 retrieves a technical specification of the identified system from a plurality of sources including, but not limited to, a manufacturer or third-party website/repository. In various embodiments, the user inputs the capabilities of the system into program 150. In various embodiments, program 150 utilizes references of historical systems to predict any missing or erroneous values. In various embodiments, program 150 stores any determined configuration and capabilities in database 122.

Program 150 determines coordinate partitions (step 204). Program 150 determines the required number of image partitions needed to fit the image into the determined training system. As discussed in step 202, program 150 determined the minimum amount of GPU memory required for the image. Program 150 combines said determination with the identified system capabilities to determine one or more coordinate (e.g., x, y, and z) image partitions. For example, a given image may have a file size of four gigabytes with a resolution of 4096×2160. In this example, program 150 identifies two available GPUs, each with two gigabytes of available memory. Here, program 150 may partition the image into two gigabyte partitions, one partition for each GPU. In some embodiments, program 150 accounts for processing overhead and incorporates the overhead prediction within the determined partitions. Program 150 minimizes the number of partitions needed so that the size for each partition is maximized. In other words, program 150 selects the minimum required partitions in order for the image to be processed on available training systems. Responsive to determining one or more partitions, program 150 creates one or more sets of one or more partitions. In an embodiment, each created set is assigned to a GPU or to a section of memory contained in one or more GPUs and systems.

Program 150 may utilize feature extraction to build derived values (features) intended to be informative and non-redundant, facilitating the subsequent learning, generalization, and to determine highly informative partitions based on derived features. In this embodiment, feature extraction reduces the amount of redundant partitions for a given image. In various embodiments, program 150 utilizes one or more CNNs created, designed, and trained for feature/boundary identification and extraction. In the various embodiments, program 150 utilizes a separate, pretrained, CNN for every feature type targeted for extraction. In an embodiment, image vectors are fed into one or more CNNs, allowing program 150 to derive common classifications and tag extracted features with identified boundaries. For example, for a feature set containing images of varying cats, program 150 utilizes feature extractor 154 to extract one or more features for the feature set (e.g., training set, image set), and tag feature boundaries (e.g., nose boundaries, nostril sizes, etc.) along the bias. In this example, said boundaries may include regions (e.g., pixel boundaries) that conform with an expected result such as sets of pixels expected to represent cat tails or paws. Other features in this example may include fur color, fur pattern, eye color, face profile, fur type, etc. In various embodiments, program 150 utilizes low-level feature detection where program 150 examines every pixel in an image to see if a feature is present in that pixel. In an embodiment, program 150 tags the boundaries along a bias or feature set.

In an embodiment, program 150 extracts the following features from image in a training set: edge detection, points in an image at which the image has discontinuities; corner, the intersection of two edges; interest points, points in an image which have a well-defined positions; blobs, regions in a digital image that differ in properties, such as brightness or color, compared to surrounding regions; ridges, one-dimensional curve representing an axis of symmetry, etc. In this embodiment, every feature has an associated CNN, dedicated to identifying and extracting said feature. In another embodiment, program 150 utilizes one or more basic features, described above, to identify complex shapes, patterns, boundaries, etc. For example, program 150 extracts multiple edges and blobs contained in an image of a cat to identify areas containing paws and create partitions that accurately exemplify said features. Program 150 utilizes one or more features to determine the position, coordinate location, and/or pixel boundaries of each partition.

Program 150 determines a padding size for each partition (step 206). Program 150 analyzes one or more convolutional filters in a neural network to determine a size of padding in order to minimize boundary distortion. In an embodiment, program 150 utilizes a convolutional filter that at the left of a partition with the left-hand side of the filter sitting on the far-left pixels of the partition. Program 150 steps the filter across the partition one column at a time until the right-hand side of the filter is on the far-right pixels of the partition. In an alternative embodiment, program 150 applies a filter to a partition to ensure that each pixel in the partition is given an opportunity to be at the center of the filter. In various embodiments, program 150 starts a filter outside of a partition allowing the pixels on the border of the partition more of an opportunity for interacting with the filter, thus allowing an opportunity for features to be detected by the filter.

Program 150 partitions image with determined coordinate partitions and determined padding size (step 208). Program 150 utilizes the determined number of partitions, determined partitions locations, and determined padding sizes to segment an image into a plurality of partitions. In an embodiment, program 150 creates a plurality of sets of segmented image partitions, adjusted and modified with the determined padding sizes. In another embodiment, program 150 assigns each set or partition to one or more GPUs for parallel processing and classification. In various embodiment, program 150 adjusts a frequency of communication by a ratio of an original image size over a partition size. For example, smaller partition sizes will have an increased communication rate when compared to large partition sizes. In a further embodiment, program 150 factors in GPU specifications such as number of GPUs, GPU compute capability (FLOPS), available GPU memory, GPU topology, GPU-GPU link bandwidth, and GPU-GPU link latency when adjusting the frequency of communication.

Program 150 trains model with partitioned image (step 210). In an embodiment, program 150 trains a classification (e.g., CNN) model (e.g., model 152) by identifying the correct weights for the model by multiple forward and backward iterations, while minimizing binary cross entropy (e.g., misclassification cost). Program 150 initializes model 152 with one or more weights and associated hyperparameters. In an embodiment, program 150 initializes model 152 with randomly generated weights. In various embodiments, program 150 utilizes weights utilized in historical or previously iterated/trained models. In this embodiment, certain features are weighed higher than others allowing the model to learn at a quicker rate with fewer computational resources.

Program 150 utilizes the plurality of segmented and modified (padded) image partitions to train model 152. In an embodiment, program 150 utilizes the partitions and associated labels to train model 152. In the depicted embodiment, program 150 utilizes a supervised training method to train model 152. As would be recognized by one skilled in the art, supervised training determines the difference between a prediction and a target (i.e., the error), and back-propagates the difference through the layers such that said model "learns". In another embodiment, the user may specify a training method to utilize such as unsupervised training, etc. In an embodiment, program 150 determines whether a sufficient accuracy or confidence is obtained by utilizing test sets. In this embodiment, program 150 retrains and adjusts model 152 until model 152 achieves a minimum accuracy and/or confidence.

Program 150 generates a prediction for every partition utilizing trained model (step 212). In various embodiments, program 150 deploys trained model 152 to a plurality of production environments or respective production, test, or auxiliary environments. In another embodiment, program 150 determines which environment to deploy model 152 from a plurality of deployment environments (e.g., test, production, backup server, containers, or virtual machines). In an embodiment, the user instructs program 150 to deploy a specific model to a specific environment.

Program 150 utilizes the deployed model to classify one or more images. In an embodiment, program 150 processes a new image utilizing the steps described in 204, 206, and 208, wherein program 150 determines coordinate partitions, padding size, and associated features of the new image. Program 150 creates and adjusts a set of partitions based the new image and the determinations detailed above. In an embodiment, program 150 assigns a dedicated GPU to each partition in the set of partitions. Program 150 feeds said set into trained model 152, generating a prediction for each partition in said set. In an embodiment, program 150 feeds each partition, in parallel, into a one or more assigned GPUs, allowing model 152 to generate one or more predictions utilizing a plurality of low memory GPUs. Program 150 utilizes model 152 to access (e.g., generate a prediction) each pixel contained in a partition. In a situation where a pixel is unique such that a current pixel is only contained in one partition, contrasting with a pixel that is contained in multiple overlapping partitions, program 150 utilizes a generalized partition prediction. In another situation where a current pixel is shared amongst multiple partitions, program 150 calculates a distance between the current pixel and to each boundary surrounding the pixel. In an embodiment, program 150 calculates an effective neighborhood of each based on a kernel size. In this embodiment, for higher dimensional partitions, program 150 selects the nearest boundary to compute a distance. In various embodiments, program 150 computes a final prediction utilizing a weighted average of all the calculated distances for each non-unique pixel. Program 150 aggregates all the pixel and partition predictions to generates one or more predictions or classifications for the image. In an embodiment, program 150, then, automatically processes and generates a prediction for a subsequent pixel, partition, and/or image, if available. In another embodiment, program 150 may merge the results from a plurality of partitions within one or more hidden or middle layers of model 152 and continue processing subsequent partitions and/or images. In this embodiment, GPU memory must allow and support the merging of partitions.

Figure 3:
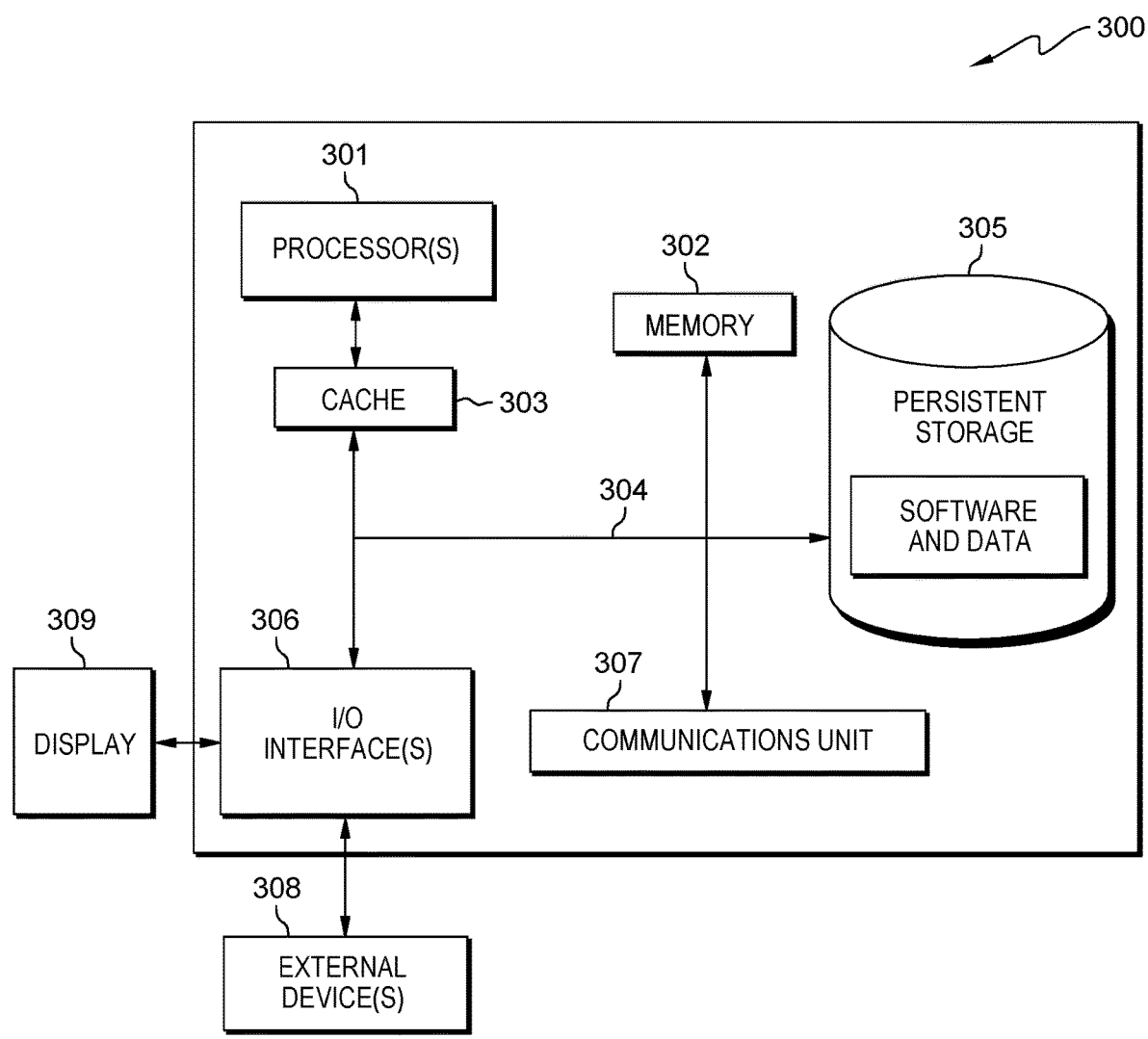
FIG. 3 is a block diagram of components of the server computer, in accordance with an embodiment of the present invention.

FIG. 3 depicts a block diagram of components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, a required amount of graphics processing unit memory for an image;
   determining, by one or computer processors, one or more coordinate partitions based on the determined required amount of graphics processing unit memory for the image and one or more characteristics of the image;

determining, by one or more computer processors, a padding size for each of the determined one or more coordinate partitions;

partitioning, by one or more computer processors, the image based on the one or more determined coordinate partitions and the determined padding size into a plurality of image partitions;

assigning, by one or more computer processors, each image partition in the plurality of image partitions in parallel to a respective graphics processing unit;

adjusting, by one or more computer processors, a frequency communication rate associated with the respective graphics processing unit for each assigned image partition, wherein the frequency communication rate is adjusted utilizing associated graphics processing unit compute capability, available graphics processing unit memory, graphics processing unit topology, graphics processing unit to graphics processing unit link bandwidth, and graphics processing unit to graphics processing unit link latency; and generating, by one or more computer processors, a prediction for the partitioned image utilizing a trained model, wherein generating the prediction comprises merging a plurality of partition predictions within one or more hidden layers of the trained model.

2. The method of claim 1, wherein one or more characteristics of the image include image size, resolution, compression type, associated metadata, and pixel quantity.

3. The method of claim 1, wherein determining the required amount of graphics processing unit memory for the image, comprises:

predicting, by one or more computer processors, one or more model characteristics based on the image characteristics;

analyzing, by one or more computer processors, a training system for a plurality of system configuration information; and determining, by one or more computer processors, the required amount of graphics processing unit memory for the image utilizing the predicted one or more model characteristics and the analyzed plurality of system configuration information.

4. The method of claim 1, wherein determining the one or more coordinate partitions based on the determined required amount of graphics processing unit memory and the one or more characteristics of the image, comprises:

minimizing, by one or more computer processors, a number of required partitions, wherein a size of each partition of the required partitions is maximized.

5. The method of claim 1, wherein determining the padding size for the determined one or more coordinate partitions, comprises:

analyzing, by one or more computer processors, one or more convolutional filters to minimize boundary distortion.

6. The method of claim 1, wherein generating the prediction for the partitioned image utilizing the trained model, comprises:

feeding, by one or more computer processors, each partition in the partitioned image into one or more assigned graphic processing units associated with the trained model;

generating, by one or more computer processors, a pixel prediction for each pixel contained in each partition in the partitioned image;

responsive to a shared pixel, calculating, by one or more computer processors, one or more distances between the shared pixel and each boundary surrounding the shared pixel;

calculating, by one or more computer processors, a weighted average based on the one or more calculated distances for each shared pixel; and generating, by one or more computer processors, the prediction for the partitioned image based the calculated weighted average.

7. The method of claim 1, wherein the trained model is a convolutional neural network.

8. The method of claim 1 further comprising:

adjusting, by one or more computer processors, the frequency of communication by a ratio of an image size over a partition size.

9. A computer program product comprising:

one or more computer readable hardware storage media and program instructions stored on the one or more computer readable hardware storage media, the stored program instructions comprising:

program instructions to determine a required amount of graphics processing unit memory for an image;

program instructions to determine one or more coordinate partitions based on the determined required amount of graphics processing unit memory for the image and one or more characteristics of the image;

program instructions to determine a padding size for each of the determined one or more coordinate partitions;

program instructions to partition the image based on the one or more determined coordinate partitions and the determined padding size into a plurality of image partitions;

program instructions to assign each image partition in the plurality of image partitions in parallel to a respective graphics processing unit;

program instructions to adjust a frequency communication rate associated with the respective graphics processing unit for each assigned image partition, wherein the frequency communication rate is adjusted utilizing associated graphics processing unit compute capability, available graphics processing unit memory, graphics processing unit topology, graphics processing unit to graphics processing unit link bandwidth, and graphics processing unit to graphics processing unit link latency; and program instructions to generate a prediction for the partitioned image utilizing a trained model, wherein the program instructions to generate the prediction comprise program instructions to merge a plurality of partition predictions within one or more hidden layers of the trained model.

10. The computer program product of claim 9, wherein one or more characteristics of the image include image size, resolution, compression type, associated metadata, and pixel quantity.

11. The computer program product of claim 9, wherein the program instructions, to determine the required amount of graphics processing unit memory for the image, comprise:

program instructions to predict one or more model characteristics based on the image characteristics;

program instructions to analyze a training system for a plurality of system configuration information; and program instructions to determine the required amount of graphics processing unit memory for the image utilizing the predicted one or more model characteristics and the analyzed plurality of system configuration information.

12. The computer program product of claim 9, wherein the program instructions, to determine the one or more coordinate partitions based on the determined required amount of graphics processing unit memory and the one or more characteristics of the image, comprise:
program instructions to minimize a number of required partitions, wherein a size of each partition of the required partitions is maximized.

13. The computer program product of claim 9, wherein the program instructions, to determine the padding size for the determined one or more coordinate partitions, comprise:
program instructions to analyze one or more convolutional filters to minimize boundary distortion.

14. The computer program product of claim 9, wherein the trained model is a convolutional neural network.

15. A computer system comprising:
one or more computer processors;
one or more computer readable hardware storage media; and
program instructions stored on the computer readable hardware storage media for execution by at least one of the one or more processors, the stored program instructions comprising:
program instructions to determine a required amount of graphics processing unit memory for an image;
program instructions to determine one or more coordinate partitions based on the determined required amount of graphics processing unit memory for the image and one or more characteristics of the image;
program instructions to determine a padding size for each of the determined one or more coordinate partitions;
program instructions to partition the image based on the one or more determined coordinate partitions and the determined padding size into a plurality of image partitions;
program instructions to assign each image partition in the plurality of image partitions in parallel to a respective graphics processing unit;
program instructions to adjust a frequency communication rate associated with the respective graphics processing unit for each assigned image partition, wherein the frequency communication rate is adjusted utilizing associated graphics processing unit compute capability, available graphics processing unit memory, graphics processing unit topology, graphics processing unit to graphics processing unit link bandwidth, and graphics processing unit to graphics processing unit link latency; and
program instructions to generate a prediction for the partitioned image utilizing a trained model, wherein the program instructions to generate the prediction comprise program instructions to merge a plurality of partition predictions within one or more hidden layers of the trained model.

16. The computer system of claim 15, wherein one or more characteristics of the image include image size, resolution, compression type, associated metadata, and pixel quantity.

17. The computer system of claim 15, wherein the program instructions, to determine the required amount of graphics processing unit memory for the image, comprise:
program instructions to predict one or more model characteristics based on the image characteristics;
program instructions to analyze a training system for a plurality of system configuration information; and
program instructions to determine the required amount of graphics processing unit memory for the image utilizing the predicted one or more model characteristics and the analyzed plurality of system configuration information.

18. The computer system of claim 15, wherein the program instructions, to determine the one or more coordinate partitions based on the determined required amount of graphics processing unit memory and the one or more characteristics of the image, comprise:
program instructions to minimize a number of required partitions, wherein a size of each partition of the required partitions is maximized.

19. The computer system of claim 15, wherein the program instructions, to determine the padding size for the determined one or more coordinate partitions, comprise:
program instructions to analyze one or more convolutional filters to minimize boundary distortion.

20. The computer system of claim 15, wherein the trained model is a convolutional neural network.

* * * * *